United States Patent [19]

Matsuzaki

[11] 4,421,396

[45] Dec. 20, 1983

[54] FOCUSSING APPARATUS FOR CAMERA

[75] Inventor: Minoru Matsuzaki, Hachioji, Japan

[73] Assignee: Olympus Optical Company Ltd., Japan

[21] Appl. No.: 381,780

[22] Filed: May 25, 1982

[30] Foreign Application Priority Data

Aug. 18, 1981 [JP] Japan ................................ 56-129526

[51] Int. Cl.³ ............................................... G03B 3/00
[52] U.S. Cl. ........................................ 354/25; 354/484
[58] Field of Search ............................................ 354/25

[56] References Cited

FOREIGN PATENT DOCUMENTS

55/40481  3/1980  Japan .

Primary Examiner—Michael L. Gellner
Attorney, Agent, or Firm—Ostrolenk, Faber, Gerb & Soffen

[57] ABSTRACT

A focussing apparatus for a camera is provided including a focussing light source for directing focussing light toward an object being photographed, and an in-focus detector circuit for receiving the focussing light as reflected by the object to determine a focussing condition. A light source control circuit is provided which deenergizes the focussing light source in response to an in-focus detection signal fed from the in-focus detector circuit.

7 Claims, 6 Drawing Figures

FOCUSSING APPARATUS FOR CAMERA

BACKGROUND OF THE INVENTION

The invention relates to a focussing apparatus for a camera, and more particularly, to such apparatus in which light from an object being photographed which is illuminated from a focussing light source is received to determine an in-focus position of a taking lens automatically.

As is well known, there are a variety of arrangements in which light from a focussing light source is reflected by an object being photographed, with the reflected light being received to determine an in-focus position of a taking lens. However, in the conventional arrangements, the focussing light source is deactivated before a shutter opening takes place in order to prevent a photographic film surface from responding to the focussing light. To this end, there is provided a mechanical switch which is operated immediately before the shutter is opened. This adds to the complexity of the arrangement and suffers from a disadvantage that a poor contact or malfunctioning may occur.

It will be noted that a conventional focussing apparatus includes a battery checker circuit which is connected in shunt with an in-focus detector circuit in order to prevent a malfunctioning thereof when the voltage of a power supply is reduced. In this manner, the operation of the in-focus detector circuit is prevented whenever a battery, serving as a power supply, is exhausted. However, the prior art employed an arrangement in which the focussing light source is illuminated independently from whether or not the in-focus detector circuit is in operation. As a result, the inoperative condition of the in-focus detector circuit, which is caused by the exhausted battery, is mistaken for a failure of the camera.

Before describing the invention, the described problems of the prior art will be considered in more detail in terms of a specific arrangement. FIG. 1 is a block diagram of an exemplary electrical circuit of a fundamental arrangement for a conventional focussing apparatus for a camera. The apparatus comprises a focussing light source $B_1$ for producing focussing light $L$ which is directed toward an object 1 being photographed, a light source control circuit LC which controls the energization or deenergization of the light source $B_1$, an in-focus detector circuit AF responsive to the focussing light as reflected from the object 1, which is illuminated by the illumination from the light source $B_1$, by determining the focussing condition, a battery checker circuit BC for disabling the in-focus detector circuit AF whenever an output voltage from a battery $E_1$, operating as a power supply, has fallen below a given voltage, an electromagnet $Mg_1$ responsive to an output from the in-focus detector circuit AF, a normally open main switch $S_1$ which is closed before the initiation of operation of a shutter (not shown) in response to a first stroke of depression of a shutter release button (not shown), and a normally closed deenergization switch $S_2$ which is turned off immediately before the shutter opening.

Specifically, a positive bus $L_2$ is connected to the positive terminal of the battery $E_1$, the negative terminal of which is connected through the main switch $S_1$ to a negative bus $L_1$. The circuits LC, AF and BC are connected across the buses $L_1$, $L_2$ so as to be fed from the battery whenever the switch $S_1$ is closed. The battery checker circuit BC has its output fed to a control input of the in-focus detector circuit AF, which in turn has its output connected to the bus $L_2$ through the electromagnet $Mg_1$. The switch $S_2$ is connected between the bus $L_1$ and a control input of the light source control circuit LC.

FIG. 2 is a circuit diagram more specifically illustrating the light source control circuit LC of the focussing apparatus shown in FIG. 1. Specifically, the control circuit LC comprises a light source deenergizing transistor $Q_4$, light source controlling transistors $Q_1$ to $Q_3$, time constant capacitor $C_1$ and resistor $R_1$, discharge diode $D_1$ and resistors $R_2$ to $R_5$. The transistor $Q_A$ is formed by an NPN transistor having its base connected through resistor $R_5$ to the bus $L_2$ and also connected through the switch $S_2$ to the bus $L_1$. The emitter of the transistor $Q_A$ is directly connected to the bus $L_1$ while its collector is connected to the bus $L_1$ through the reversely poled diode $D_1$ and also connected to the junction between the capacitor $C_1$ and resistor $R_1$. The capacitor $C_1$ has its one end connected to the bus $L_2$ and its other end connected to one end of resistor $R_1$, the other end of which is connected through resistor $R_2$ to the bus $L_1$. The junction between the resistors $R_1$ and $R_2$ is connected to the base of the transistor $Q_1$. The transistor $Q_1$ is formed by an NPN transistor having its emitter directly connected to the bus $L_1$ and its collector connected through resistor $R_3$ to the bus $L_2$ and also connected to the base of the next following transistor $Q_2$. The transistor $Q_2$ is again formed by an NPN transistor, and has its emitter connected directly to the bus $L_1$, and its collector connected through resistor $R_4$ to the bus $L_2$ and also connected to the base of the final stage transistor $Q_3$. The transistor $Q_3$ is also formed by an NPN transistor, and has its emitter directly connected to the bus $L_1$ and its collector connected through light source $B_1$ to the bus $L_2$.

In FIG. 2, reference character $Q_B$ represents an electromagnet controlling transistor having its collector-to-emitter path shunted by a Zener diode $ZD_1$ which prevents the occurrence of spikes resulting from a back electromotive force of the electromagnet $Mg_1$. The transistor $Q_B$ is formed by an NPN transistor, and has its base connected to the output of the in-focus detector circuit AF, its emitter directly connected to the bus $L_1$ and its collector connected through the electromagnet $Mg_1$ to the bus $L_2$. It will be noted that the diode $ZD_1$ is forwardly connected across the emitter and collector of the transistor $Q_B$.

It is to be understood that the in-focus detector circuit AF of the present focussing apparatus includes an exposure control circuit so that an output from the detector circuit AF energizes the electromagnet $Mg_1$ in order to control an exposure period, in addition to controlling the focussing operation. (Refer to the following description of the operation of the invention for detail.)

In operation, immediately before a shutter is to be opened, the switch $S_2$ is turned off (opened) to permit the transistor $Q_A$ to be turned on. If then the capacitor $C_1$ has not been completely charged and the light source $B_1$ is illuminated, a rapid charging of the capacitor $C_1$ is permitted through the collector-emitter path of the transistor $Q_A$, causing the transistor $Q_1$ to be turned off. This turns the transistor $Q_2$ on and turns the transistor $Q_3$ off, thus deenergizing the light source $B_1$. Accordingly, a photographic film is prevented from being exposed to the focussing light from the light source $B_1$. However, the use of mechanical switch $S_2$ adds to the complexity of the arrangement and causes a failure due to poor contact or malfunctioning.

When an output voltage from the battery $E_1$ has reduced below a given value, this fact is detected by the battery checker circuit BC, which in turn disables the in-focus detector circuit AF. Accordingly, no focussing operation takes place, and the taking lens is not displaced from its initial position. However, it will be noted that the battery checker circuit is not associated with the control circuit LC, and hence the light source $B_1$ will be illuminated even when the output voltage from the battery $E_1$ has reduced, in the same manner as when a normal voltage prevails. Thus it will be seen that the source $B_1$ is illuminated even though no focussing operation takes place, and hence there is a likelihood of mistaking the absence of a focussing operation for a mechanical or electrical failure of the arrangement since the source $B_1$ is illuminated.

SUMMARY OF THE INVENTION

It is an object of the invention to eliminate the described problems of the prior art, by providing a focussing apparatus for camera in which a focussing light source is deenergized in response to an in-focus detection signal from an in-focus detector circuit.

It is another object of the invention to provide a focussing apparatus for camera which prevents the energization of a focussing light source whenever an in-focus detector circuit is inoperative.

In accordance with the invention, an in-focus detection signal which is outputted from the in-focus detector circuit causes the focussing light source to be deenergized without using a mechanical switch. In this manner, it is assured that the focussing light source is extinguished before a shutter opens.

The illumination of the focussing light source is also prevented when the in-focus detector circuit is inoperative as a result of a supply voltage which is below a given value. Thus, the exhaustion of the supply battery can be reliably advised by recognizing the illumination or non-illumination of the focussing light source. In this manner, the likelihood that the absence of a focussing operation may be mistaken for a failure of the camera is eliminated.

DESCRIPTION OF PREFERRED EMBODIMENTS

Figure 1:
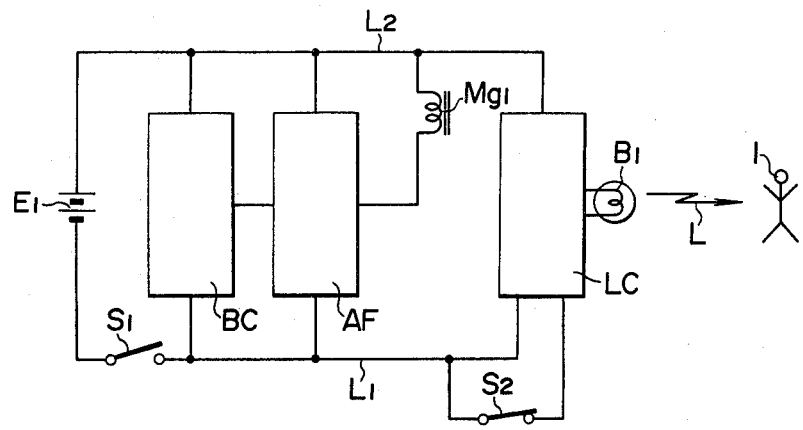
FIG. 1 is a block diagram of an exemplary electrical circuit of a fundamental arrangement for a conventional focussing apparatus for a camera.
Figure 3:
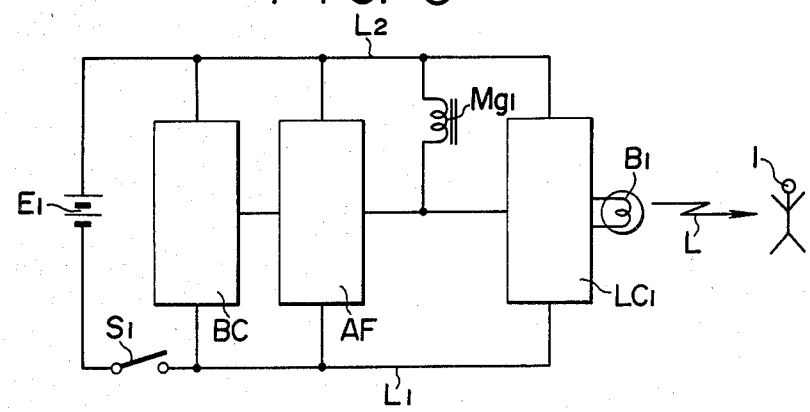
FIG. 3 is a block diagram of an electrical circuit which represents the fundamental arrangement of the focussing apparatus for a camera according to the invention.

Referring to FIG. 3, there is shown a block diagram of an electrical circuit which represents the fundamental arrangement for a focussing apparatus for a camera according to the present invention. In the present focussing apparatus, the conventional focussing apparatus shown in FIG. 1 is modified by connecting the output of the in-focus detector circuit AF to the control input of the light source control circuit $LC_1$ and removing the switch $S_2$ which deenergizes the light source.

Figure 2:
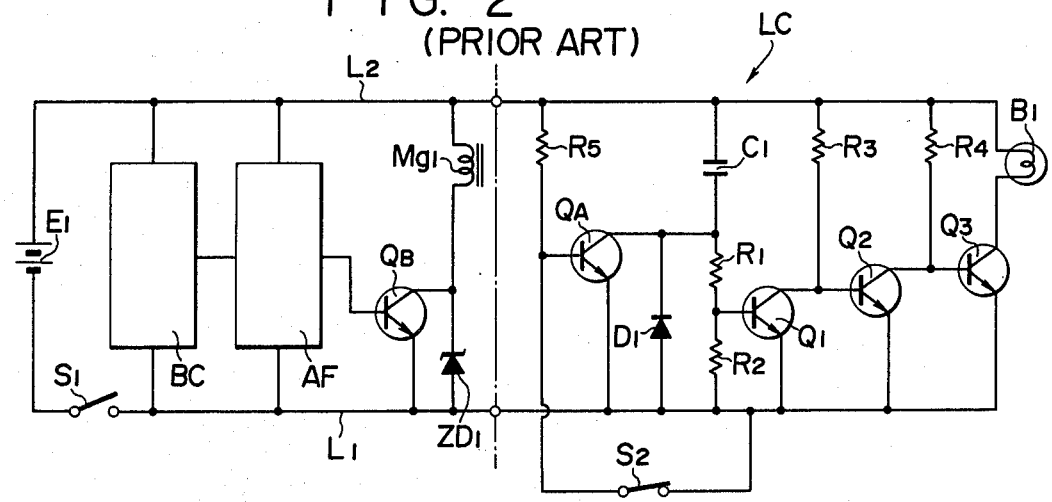
FIG. 2 is a circuit diagram of the focussing apparatus shown in FIG. 1, in particular, illustrating the detail of the light source control circuit.
Figure 4:
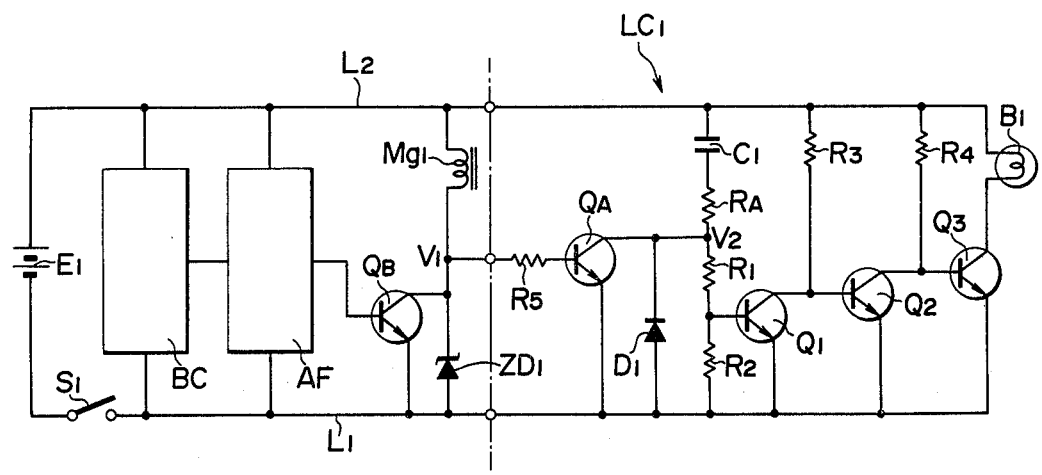
FIG. 4 is a circuit diagram of the focussing apparatus shown in FIG. 3, in particular, illustrating the detail of the light source control circuit.

FIG. 4 is a circuit diagram of the focussing apparatus shown in FIG. 3, in particular, illustrating the detail of the light source control circuit $LC_1$. It will be noted that this electrical circuit is a slight (although significant) modification of the electrical circuit shown in FIG. 2 in that the base of the transistor $Q_A$ is connected through resistor $R_5$ to the collector of the electromagnet controlling transistor $Q_B$, and the switch $S_2$ is removed. It will be noted that a resistor $R_A$ having a resistance which is very small as compared with the resistance of resistor $R_1$ is connected in series between the capacitor $C_1$ and the resistor $R_1$, with the collector of the transistor $Q_A$ being connected to the junction between resistors $R_A$ and $R_1$.

The operation of the focussing apparatus of the invention will now be described with reference to timing charts shown in FIGS. 5(A1) to (C4).

Initially, the camera is directed toward the object 1 being photographed, and the shutter release button (not shown) is depressed. During its initial stroke, the button causes the main switch $S_1$ to be turned on (closed) as indicated in FIG. 5(A1), whereby the light source control circuit $LC_1$, the in-focus detector circuit AF and the battery checker circuit BC are fed from the battery $E_1$ through the buses $L_1$, $L_2$.

(1) When the battery $E_1$ has an output voltage above a given value:

In this instance, the battery checker circuit BC detects that the output voltage is above a given value, and enables the in-focus detector circuit AF for operation. Accordingly, the in-focus detector circuit AF produces an output of high level (hereafter referred to as "H" level), turning the transistor $Q_B$ on. Accordingly, the collector voltage $V_1$ of the transistor $Q_B$ assumes a low level (hereafter referred to as "L" level), as indicated in FIGS. 5(A2) and (B1), energizing the electromagnet $Mg_1$. This enables a focussing operation to take place. Since the voltage $V_1$ assumes "L" level and the transistor $Q_A$ (within the light source control circuit $LC_1$) is off, the collector voltage $V_2$ of the transistor $Q_A$ assumes its "H" level, as indicated in FIG. 5(A3). However, the capacitor $C_1$ begins to be charged through resistors $R_A$, $R_1$ and the base-emitter path of the transistor $Q_1$, with a time constant determined by the capacitance of the capacitor $C_1$ and the resistance of resistor $R_1$. Hence, the voltage $V_2$ decreases gradually, as indicated in FIGS. 5(A3) and (B2). (It is to be understood that because the resistance of the resistor $R_A$ is substantially less than that of resistor $R_1$, the resistance of resistor $R_A$ is neglected.) As the charging current of the capacitor $C_1$ flows across the base and emitter of transistor Q, the transistor $Q_1$ is turned on, as indicated in FIGS. 5(A4) and (B3), whereby the transistor $Q_2$ is turned off and the transistor $Q_3$ is turned on. In this manner, the light source $B_1$ is energized for illumination, as indicated in FIGS. 5(A5) and (B4).

The light from the source $B_1$ illuminates the object 1, and the light L which is reflected by the object is intercepted by the in-focus detector circuit AF, which determines an in-focus position of the taking lens based on the light L. When it determines the in-focus position, the circuit AF reverses its output to its "L" level. Hence, the transistor $Q_B$ is turned off, and the voltage $V_1$ returns to its "H" level, as indicated in FIGS. 5(A2) and (B1). This deenergizes the electromagnet $Mg_1$, and a member (not shown) which positions the taking lens is moved to a position which corresponds to the in-focus position of the taking lens.

Figure 5:
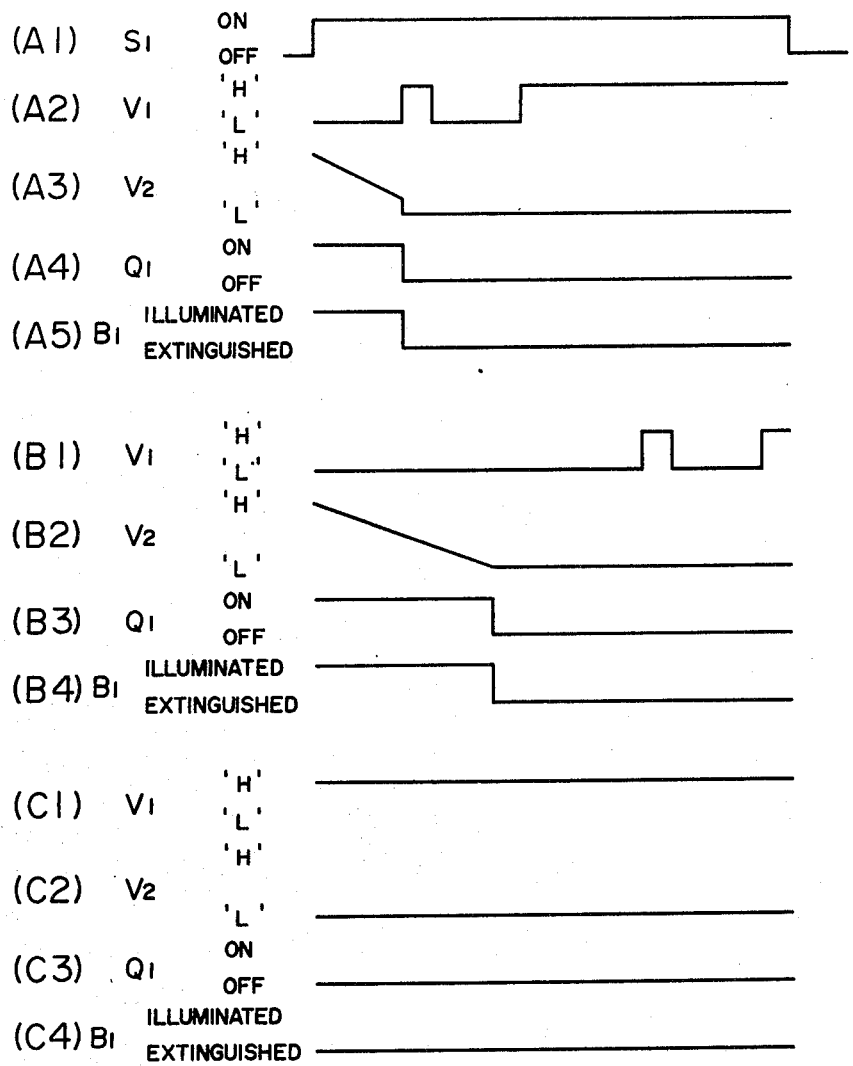
FIG. 5 are timing charts illustrating the operation of the focussing apparatus shown in FIG. 4.

In the event the in-focus detection signal is outputted by the in-focus detector circuit AF before the charging of the capacitor $C_1$ is completed (See FIGS. 5 (A1)-(A5), the capacitor $C_1$ is charged substantially instantaneously through the collector-emitter path of the transistor $Q_A$ at the time the voltage $V_1$ reaches its "H" level, as shown in FIGS. 5(A2) and (A3), so that the transistor $Q_1$ is turned off at this time, as indicated in FIG. 5(A4), causing the transistor $Q_2$ to be turned on and the transistor $Q_3$ to be turned off to thereby deenergize the light source $B_1$, as indicated in FIG. 5(A5).

In the event the in-focus detection signal is outputted after the completion of charging of the capacitor $C_1$ (See FIGS. 5(B1)-(B5)), the transistor $Q_1$ is turned off as indicated in FIG. 5(B3) at the time when the charging of the capacitor $C_1$ is completed to allow the voltage $V_2$ to reach "L" level as indicated in FIGS. 5(B1) and (B2), thus allowing the transistor $Q_2$ to be turned on and the transistor $Q_3$ to be turned off to deenergize the light source $B_1$, as indicated in FIG. 5(B4).

When the shutter release button is depressed further downward, the taking lens is unlocked, and bias means, not shown, allows the taking lens to move until it abuts against the positioning member, thus positioning the lens at the in-focus position. A shutter release mechanism also begins operating, and immediately before the opening of a sector of the shutter, the in-focus detector circuit AF including an exposure control circuit produces an output of "H" level again, thus initiating an exposure control. Thereupon, the transistor $Q_B$ is turned on, and the voltage $V_1$ changes to its "L" level as indicated in FIGS. 5(A2) and (B1), allowing the electromagnet $Mg_1$ to be energized to maintain the sector of the shutter open.

Subsequently when the exposure control circuit within the in-focus detector circuit AF determines that a proper amount of exposure has been given to the photographic film during the time the sector is open, the output from the circuit AF changes to its "L" level to thereby turn the transistor $Q_B$ off, whereby the voltage $V_1$ changes to its "H" level as indicated in FIGS. 5(A2) and (B1), causing the electromagnet $Mg_1$ to be deenergized to thereby close the shutter. In this manner, an exposure of the photographic film to a light image of the object is completed.

(2) When the battery $E_1$ has an output voltage which is less than a given value:

In this instance, the battery checker circuit BC detects that an output voltage of the battery $E_1$ is less than a given value, and disables the in-focus detector circuit AF. Accordingly, the in-focus detector circuit AF produces an output of "L" level, which turns the transistor $Q_B$ off. As indicated in FIG. 5(C1), the voltage $V_1$ remains unchanged from its "H" level. Accordingly, the transistor $Q_A$ is turned on, and the capacitor $C_1$ is charged substantially instantaneously through the collector-emitter path of the transistor $Q_A$ substantially at the same time as the closure of the switch $S_1$. Hence, as indicated in FIG. 5(C2), the voltage $V_2$ is at its "L" level, and the transistor $Q_1$ cannot be turned on as indicated in FIG. 5(C3), and thus the light source $B_1$ is not energized as indicated in FIG. 5(C4).

It is to be noted that the capacitor $C_1$ gradually discharges through resistor $R_4$, transistor $Q_3$ and diode $D_1$ from the time on when the shutter release button is released and is allowed to return to thereby open the switch $S_1$.

Figure 6:
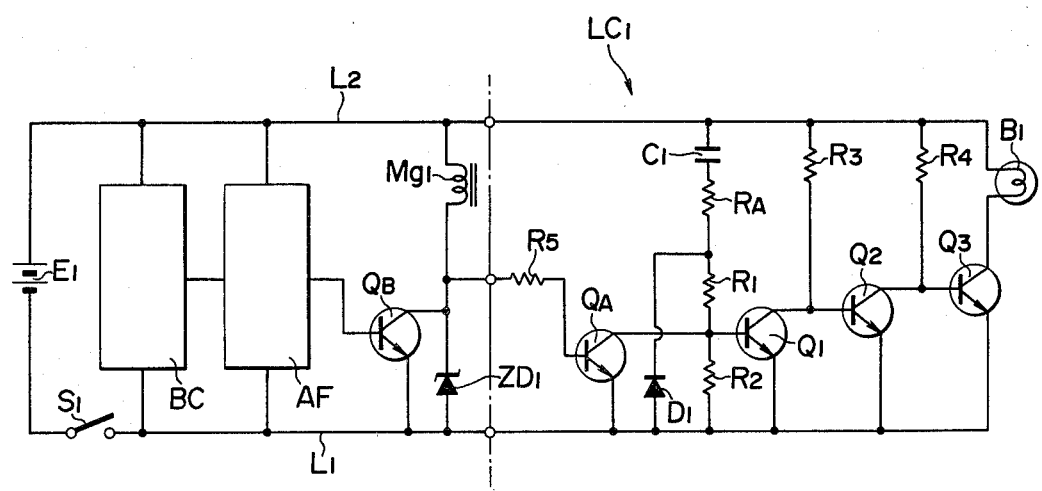
FIG. 6 is a circuit diagram of the electrical circuit of the focussing apparatus for camera according to another embodiment of the invention.

FIG. 6 is a circuit diagram of a focussing apparatus for camera according to another embodiment of the invention. In this apparatus, the collector of the transistor $Q_A$ is connected to the junction between resistors $R_1$ and $R_2$ or to the base of the transistor $Q_1$, rather than to the junction between the resistors $R_A$ and $R_1$.

This connection of the collector of the transistor $Q_A$ does not change the operation of the transistor $Q_A$ at all, and the apparatus operates in quite the same manner as the focussing apparatus shown in FIG. 4.

As discussed above, in accordance with the invention, the light source control circuit is connected to the in-focus detector circuit so that the illumination of the focussing light source is controlled in accordance with an in-focus detection signal, thus allowing a convenient focussing apparatus for camera to be provided which eliminates the difficulties of the prior art initially mentioned.

In the described embodiments, it has been assumed that the in-focus detector circuit includes an exposure control circuit, the output of which controls an electromagnet so that both a focussing operation and an exposure control operation may be performed. Alternatively, an exposure control circuit may be removed out of the in-focus detector circuit, which then operates to control the focussing electromagnet alone.

What is claimed is:

1. A focussing apparatus for a camera, comprising:
   a focussing light source for directing a focussing light toward an object being photographed;
   an in-focus detector circuit for determining an in-focus condition in response to the focussing light which it receives as the light is reflected by the object being photographed; and
   a light source control circuit for deenergizing the focussing light source in response to an in-focus detection signal fed from the in-focus detector circuit and indicating an in-focus condition.

2. A focussing apparatus according to claim 1, further comprising a battery checker circuit which is operative to check the voltage of a power supply, supplying said focussing operation, the light source control circuit cooperating with the in-focus detector circuit to prevent the focussing light source from being energized as the in-focus detector circuit is disabled for operation by the battery checker circuit.

3. A focussing apparatus according to claim 1 in which the light source control circuit comprises a deenergizing transistor which is turned on and off in response to an output signal from the in-focus detector circuit, a time constant circuit including a capacitor and a resistor for controlling a time interval during which the focussing light source is energized for illumination, a switching transistor controlled by the time constant ciircuit and the deenergizing transistor for an on-and-off operation which controls the energization or deenergization of the focussing light source, and a diode which provides a discharge path for the capacitor of the time constant circuit.

4. A focussing apparatus according to claim 3 in which the deenergizing transistor is turned off in response to an output signal from the in-focus detector circuit which is produced when the latter is enabled for operation, thereby activating the time constant circuit to allow the focussing light source to be energized through the switching transistor, the deenergizing transistor being turned on in response to an in-focus detection signal fed from the in-focus detector circuit to permit the capacitor in the time constant circuit to be rapidly charged, thus reversing the switching transistor to deenergize the focussing light source.

5. A focussing apparatus according to claim 3 in which the time constant circuit provides a time interval determined in accordance with the time constant thereof, and after which an output voltage therefrom causes the switching transistor to be driven into an opposite state to deenergize the focussing light source.

6. A method for focussing a camera, comprising the steps of:
   energizing a focussing light source which directs a focussing light towards an object being photographed;
   determining an in-focus condition in response to focussing light reflected off the object being photographed; and
   disabling the focussing light source as soon as said in-focus condition has been determined.

7. The method of claim 6, further comprising the step of preventing said focussing light source from being enabled when the voltage of a power supply supplying said light source falls below a predetermined value.

* * * * *